United States Patent
Warnan et al.

(10) Patent No.: US 10,457,366 B2
(45) Date of Patent: Oct. 29, 2019

(54) FISH WITH VARIABLE HYDRODYNAMIC LIFT AND TOW LINE COMPRISING THE FISH

(71) Applicant: THALES, Courbevoie (FR)

(72) Inventors: François Warnan, Brest (FR); Michaël Jourdan, Brest (FR); Philippe Vicariot, Brest (FR); Jean Lagadec, Brest (FR)

(73) Assignee: THALES, Courbevoie (FR)

( * ) Notice: Subject to any disclaimer, the term of this patent is extended or adjusted under 35 U.S.C. 154(b) by 74 days.

(21) Appl. No.: 15/553,567

(22) PCT Filed: Feb. 26, 2016

(86) PCT No.: PCT/EP2016/054152
§ 371 (c)(1),
(2) Date: Aug. 24, 2017

(87) PCT Pub. No.: WO2016/135326
PCT Pub. Date: Sep. 1, 2016

(65) Prior Publication Data
US 2018/0015992 A1  Jan. 18, 2018

(30) Foreign Application Priority Data
Feb. 27, 2015  (FR) ...................... 15 00386

(51) Int. Cl.
*B63G 8/18* (2006.01)
*G01V 1/38* (2006.01)
*B63G 8/42* (2006.01)
*G01C 13/00* (2006.01)
*G01S 15/88* (2006.01)

(52) U.S. Cl.
CPC .............. *B63G 8/18* (2013.01); *B63G 8/42* (2013.01); *G01C 13/00* (2013.01); *G01V 1/3826* (2013.01); *G01S 15/88* (2013.01)

(58) Field of Classification Search
CPC ......... B63B 21/66; B63B 21/663; B63G 8/14; B63G 8/18; B63G 8/24; B63G 8/26; B63G 8/42; G01V 1/38; G01V 1/3817; G01V 1/3826; G01C 13/00; G01S 15/88
See application file for complete search history.

(56) References Cited

U.S. PATENT DOCUMENTS

| 3,412,704 | A | | 11/1968 | Buller et al. |
|---|---|---|---|---|
| 3,611,975 | A | | 10/1971 | Ashbrook |
| 3,680,520 | A | | 8/1972 | Smith |
| 6,111,817 | A | * | 8/2000 | Teeter .................. G01V 1/3826 367/106 |

FOREIGN PATENT DOCUMENTS

FR  2655940 A1  6/1991

* cited by examiner

*Primary Examiner* — Ajay Vasudeva
(74) *Attorney, Agent, or Firm* — Baker & Hostetler LLP

(57) ABSTRACT

In the field of bodies towed behind a ship, commonly called fish, a fish comprises a supporting structure configured to move in water in a horizontal main direction, at least one appendage configured to generate a hydrodynamic lift directed downwards when the fish moves in the water under the towing effect, and a lock for reducing the hydrodynamic lift of the appendage.

15 Claims, 5 Drawing Sheets

FISH WITH VARIABLE HYDRODYNAMIC LIFT AND TOW LINE COMPRISING THE FISH

CROSS-REFERENCE TO RELATED APPLICATIONS

This application is a National Stage of International patent application PCT/EP2016/054152, filed on Feb. 26, 2016, which claims priority to foreign French patent application No. FR 1500386, filed on Feb. 27, 2015, the disclosures of which are incorporated by reference in their entirety.

FIELD OF THE INVENTION

The invention relates to bodies towed behind a ship. These objects are commonly called fish. They are used in particular in the field of variable depth sonars. The fish is then provided with acoustic transmitting or receiving antennas.

BACKGROUND

To properly carry out the mission thereof, the fish is provided with suitable hydrodynamic features. For example, the fish is configured to develop significant vertical forces that allow it to dive to a desired depth despite the towing speed that tends to make it rise to the surface.

The simplest way to develop these vertical forces is to increase the weight of the fish beyond buoyancy. The weight has the advantage of being constant irrespective of the speed of the ship that pulls the fish. Another means consists in arranging, on the fish, a set of hydrodynamic fins, the lift of which is directed downwards. Given the density of water, these fins are quite short and wide and are housed easily on a towed body. The downward hydrodynamic lift force increases with the square of the speed of the fish with respect to the water. As a result, the greater the speed, the more the fish is kept submerged.

Towed sonars are mainly used in the military field. It can be that the ship operating with the sonar thereof submerged at depth suddenly has to escape, for example, if pursued by a torpedo. In this case, given the urgency, it is not possible to bring the towed body back on board. It must be possible for the escape speed of the ship to be supported by both the towed body and the fish towing cable. Indeed, the cable is subjected to a hydrodynamic drag which increases with speed.

The cable must be sized to withstand a maximum tension generated by the ship for a given escape speed. Other elements, such as the towing machine and the attachments thereof on the deck of the ship, must also be sized to resist this maximum tension. A high escape speed requires all of the elements involved in the towing operation to be oversized. Oversizing the cable leads to increasing the dimensions thereof and to further increasing the hydrodynamic drag thereof and, consequently, the pulling effort on the cable.

During the escape of the ship, in order to limit the tension of the cable, one maneuver consists in bringing back on board as much cable as possible. To allow such a maneuver, the towing winch must also be oversized.

For a given piece of equipment, there are two solutions. The first is the limitation of the escape speed of the ship and the second, in an extreme case, is to cut the tow line in order to avoid untimely breaking. This, of course, involves the loss of the towed body.

The aim of the invention is to overcome all or some of the problems mentioned above by proposing to limit the hydrodynamic efforts on the fish, if necessary.

To this end, the object of the invention is a fish intended to be submerged and towed by a cable, the fish comprising a supporting structure configured to move in water in a horizontal main direction and at least one appendage configured to generate, for the fish, a hydrodynamic lift directed downwards when the fish moves in the water under the towing effect, characterized in that the appendage is orientable between a first position generating a maximum value of the hydrodynamic lift of the fish and a second position generating a reduced value of the hydrodynamic lift of the fish, in that the fish comprises a lock which, in a locked configuration, keeps the appendage orientated in the first position and which, in an unlocked configuration, frees the orientation of the appendage, and in that the appendage is configured to move from the first position to the second position under the effect of a hydrodynamic lift specific to the appendage.

By reducing the hydrodynamic lift of the fin, the fish tends to rise towards the surface of the water. This advantage can be useful in cases other than the escape of the ship. When there is an unforeseen shoal, the towed body can abut against this shoal leading to a risk of the tow line breaking and the towed body being lost. Slowing down the ship would only aggravate the situation by making the towed body dive. By using the means to reduce the hydrodynamic lift of the fin, the fish tends to rise and is, thus, in a better position to avoid the shoal.

SUMMARY OF THE INVENTION

The fish advantageously comprises an explosive member configured to unlock the lock.

In the second position, the hydrodynamic lift of the fish is advantageously substantially zero, or possibly directed upwards.

In one embodiment, the fish comprises at least one fin mainly generating the hydrodynamic lift of the fish depending on the orientation of the supporting structure with respect to the main direction. The orientable appendage is then a tail configured to change the orientation of the supporting structure with respect to the main direction. The fin can be fixed with respect to the supporting structure.

In one embodiment, the appendage is an orientable fin mainly generating the hydrodynamic lift of the fish which can comprise a tail fixed with respect to the supporting structure, the tail making it possible to maintain the orientation of the supporting structure with respect to the main direction.

The fish can comprise a pivot link allowing the rotation of the appendage with respect to the supporting structure. The pivot link is then offset from a point of application of a resultant of efforts of hydrodynamic lift specific to the appendage so as to allow the movement from the first position to the second position under the effect of the hydrodynamic lift specific to the appendage.

The fish can comprise a sensor for measuring a parameter and the fact of a threshold value being exceeded by the measured value can cause the lock to move into the unlocked configuration.

The fish can comprise two orientable appendages. The orientations of each of the two appendages are then coordinated.

The fish is electrically powered. The lock can be configured such that the powering of the fish keeps the lock in the locked configuration and such that a cut in power causes the lock to move into the unlocked configuration.

Another object of the invention is a tow line comprising a fish according to the invention, a ship, a cable fixed to the fish, and, arranged on the ship, means for commanding the lock which are arranged on the ship.

The command means can be configured to be triggered manually or automatically. The command means can comprise a switch for opening a power supply circuit for the fish. In the case of automatic triggering, the tow line can comprise a sensor for measuring a parameter. If the measured value exceeds a threshold value, this triggers the means for reducing the hydrodynamic lift of the fin.

BRIEF DESCRIPTION OF THE DRAWINGS

The invention will be better understood and other advantages will appear on reading the detailed description of an embodiment given by way of example, which description is illustrated by the appended drawing in which.

For the sake of clarity, the same elements will bear the same references in the various figures.

DETAILED DESCRIPTION

The invention is described with respect to the towing of a sonar by a surface vessel. Of course, the invention can be used for other towed elements and for other towing means.

Figure 1:
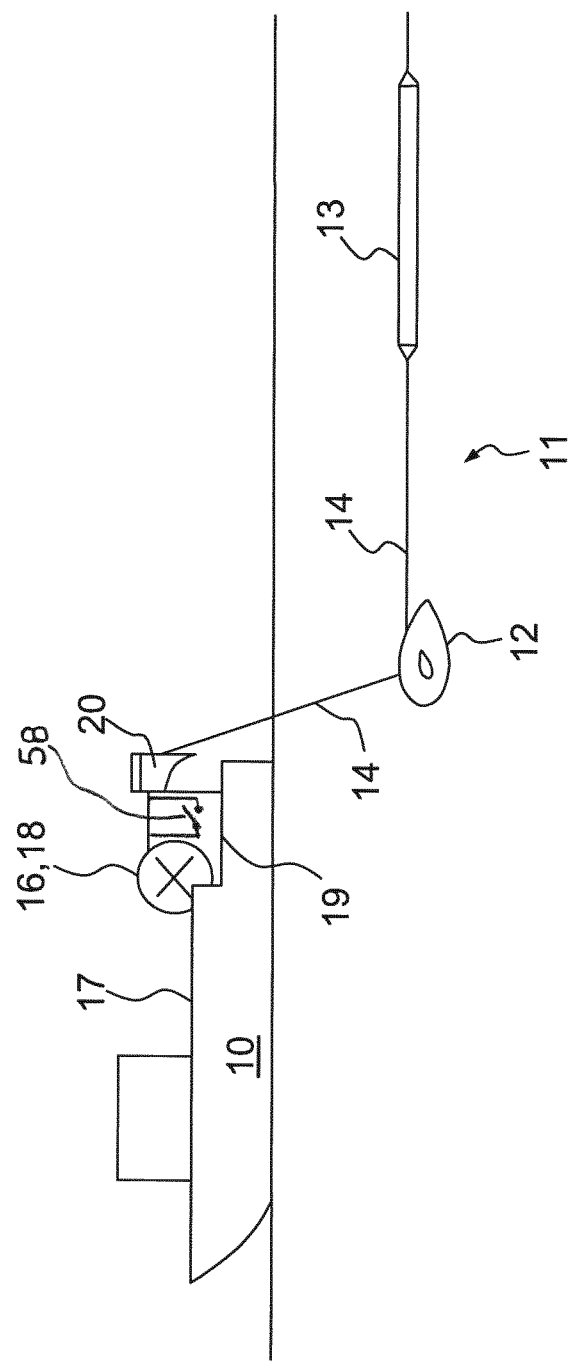
FIG. 1 schematically shows a ship pulling an active sonar.

FIG. 1 shows a ship 10 pulling an active sonar 11 comprising an acoustic transmission antenna 12 commonly called a fish and an acoustic receiving antenna 13 often called a streamer. The sonar 11 also comprises a cable 14 for pulling the two antennas 12 and 13. The cable also carries signals and power between the ship and the antennas 12 and 13 of the sonar 11. It is also possible to provide two separate cables, one for pulling the fish 12 and the other for the streamer 13, the cable pulling the streamer then being fixed to the fish 12. The invention relates more particularly to the fish 12 and can be implemented without a streamer 13.

The antennas 12 and 13 are mechanically secured and electrically and/or optically connected to the cable 14 in an appropriate manner. Conventionally, the receiving antenna 13 is formed from a linear antenna of tubular shape identical to those found in passive sonars, whereas the transmitting antenna 12 is integrated in a volumetric structure having a shape resembling that of a fish. The receiving streamer is generally arranged at the rear, at the end of the cable 14, the fish being positioned on the part of the cable 14 closest to the ship 10. During a subsea acoustics mission, the antenna 12 transmits sound waves in the water and the receiving antenna 13 captures possible echoes coming from targets on which the sound waves coming from the antenna 12 are reflected.

The launching and the removal from the water of the antennas 12 and 13 is carried out by means of a winch 16 arranged on a deck 17 of the ship 10. The winch comprises a cable drum 18 sized to enable the cable 14 and the receiving antenna 13 to be wound up. The winch 16 also comprises a framework intended to be fixed on the deck of the ship. The cable drum 18 can turn with respect to the framework to enable the cable to be wound up. Winding up the cable 14 makes it possible to haul the fish 12 on board the ship 10, for example on a rear platform 19 provided for this purpose.

A fairlead 20 makes it possible to guide the cable 14 downstream of the cable drum 18. The fairlead 20 forms the last element for guiding the cable 14 before it descends into the water. The cable 14 comprises, for example, a core formed of electrical and/or optical conductors for sending energy and information between sonar equipment located on board the ship 10 and the antennas 12 and 13. The core of the cable 14 is generally covered with a strand of metal wires providing the mechanical strength of the cable 14, in particular at pulling. The cable 14 can be covered with scales configured to adjust the hydrodynamic profile thereof in order to limit the drag thereof.

Figure 2:
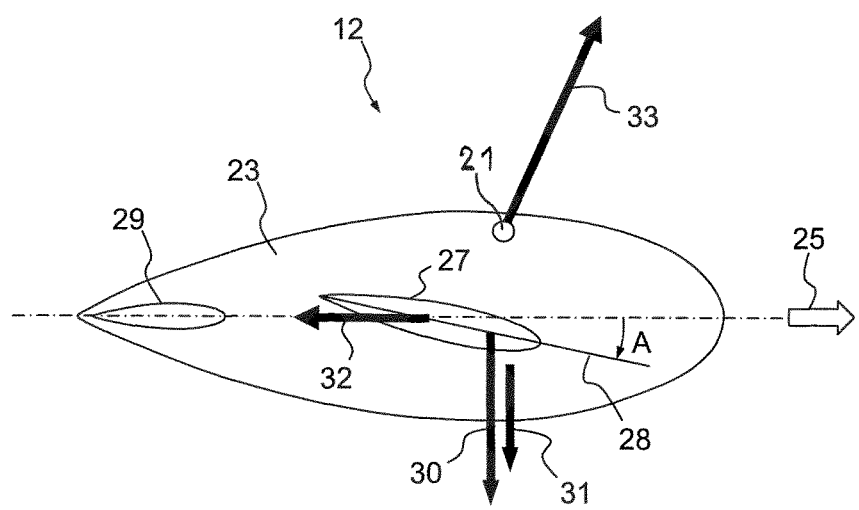
FIG. 2 shows a towed body of the sonar of FIG. 1.

FIG. 2 shows the fish 12 in profile. The fish 12 comprises a catch 21 configured to allow the fish 12 to be fixed to the cable 14. The catch comprises a possibly removable mechanical connector and, if necessary, a connector, for example an electrical or optical connector, making it possible to send information and/or power between the fish 12 and the cable 14. The fish 12 is configured to translationally move in the water in a direction 25 shown horizontally in FIG. 2. The fish 12 comprises a supporting structure 23 and at least one fin 27 making it possible to generate, for the fish 12, a hydrodynamic lift 30 directed downwards when the fish moves in the direction 25. The fish 12 itself and other appendages of the fish 12 are involved in generating the overall hydrodynamic lift of the fish 12. The fin 27 mainly generates the overall hydrodynamic lift of the fish 12. For example, the fin 27 has a profile symmetrical about a direction 28. To generate the lift 30, the direction 28 of the fin 27 is inclined by an angle A with respect to the direction 25. The angle A is orientated negatively in the trigonometric direction in order to direct the lift 30 downwards. The fish 12 can also comprise a tail 29 located towards the rear of the fish 12 according to the direction 25. The tail 29 makes it possible to stabilize the movement of the fish 12 in the direction 25. The angle A has, for example, a value of approximately 8°. Of course, this value can be adjusted depending on the desired lift and the profile of the fin 27.

In addition to the lift 30, the fish is subjected to various forces when it moves in the direction 25: the weight 31 thereof, the drag 32 thereof and the pull 33 exerted by the cable 14. In order to not overload FIG. 2, the antenna 13 is taken to be absent. The possible presence of an antenna 13 would increase the drag 32. In a first approach, when the fish advances at a constant speed, the vector sum of the various forces to which it is subjected is zero.

According to the invention, the fish 12 comprises means for reducing the hydrodynamic lift of the fin 27 and therefore the overall hydrodynamic lift thereof. In this case, the lift is considered to be positive when it is directed downwards, wherein the reduction of the lift can, of course, go so far as to cancel the lift and even make it negative, i.e. directed upwards and tending to raise the fish 12 towards the surface. Nevertheless, such a negative lift would tend to increase the resultant of the pulling efforts on the cable 14. The fish 12 rising is especially of interest when an unforeseen shoal appears.

Figure 3:
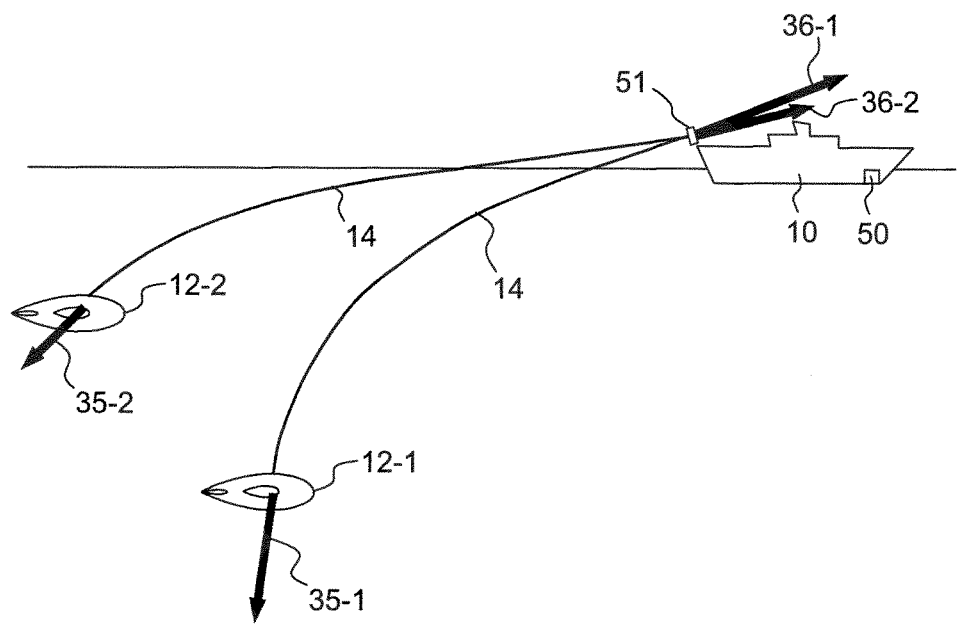
FIG. 3 shows the ship of FIG. 1 pulling the towed body in two hydrodynamic configurations of the towed body.

FIG. 3 shows two configurations in which the ship 10 pulls the fish 12. In the first configuration, the fish 12 is referenced as 12-1. In this configuration, the fin 27 provides a downwardly directed lift. The vector sum of the efforts due to the weight, the drag and the lift is referenced as 35-1. At the ship 10 level, the resultant 35-1 causes a pulling effort 36-1 on the cable 14. In the second configuration, the fish is referenced as 12-2. In this configuration, the fin 27 no longer provides lift, or a very reduced lift. The vector sum of the efforts due to the weight and the drag is referenced as 35-2. At the ship 10 level, the resultant 35-2 causes a pulling effort 36-2 on the cable 14. In both configurations, the speed of the ship 10 is the same and the modulus of the pulling effort 36-2 is less than the modulus of the pulling effort 36-1. This difference makes it possible to increase the speed of the ship. In other words, if the entire towing chain (winch, cable and fish) is sized to operate with an effort 36-1 at a given speed for the ship 10, reducing the lift of the fish 12 makes it possible to increase the given speed until reaching an effort 36-2, the modulus of which is equal to the modulus of the effort 36-1 at lower speed.

Figure 4:
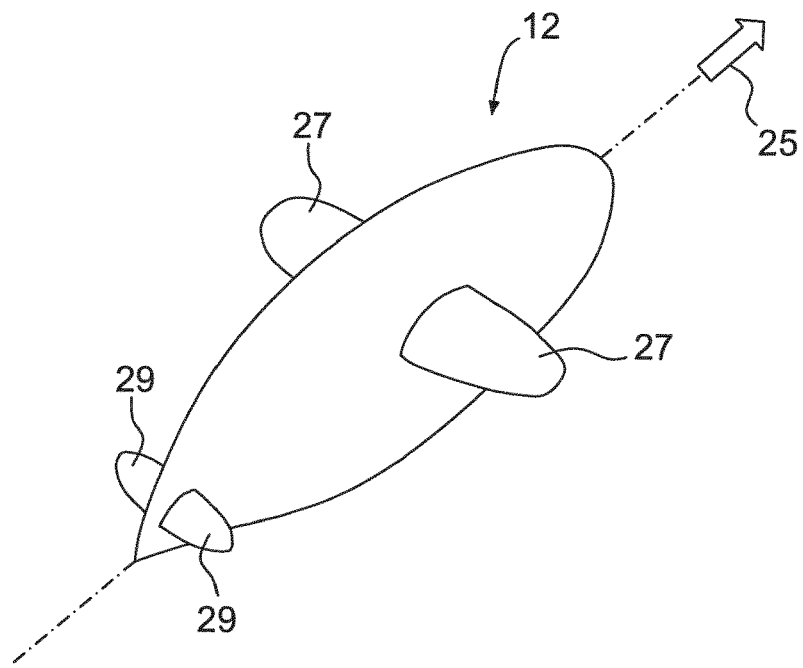
FIG. 4 shows a fish comprising two fins.
Figure 5:
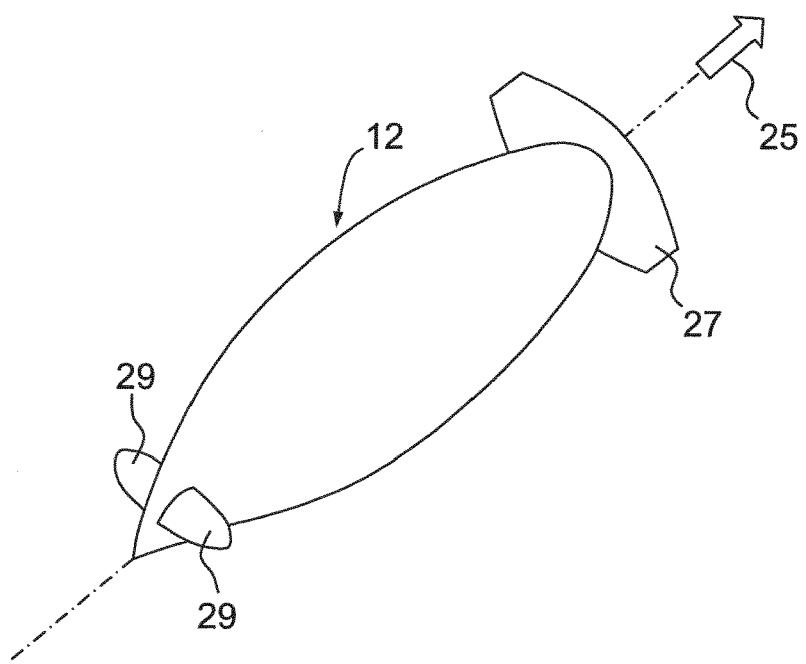
FIG. 5 shows a fish comprising a single fin.

In FIG. 2, only one fin 27 is shown on one side of the fish 12. It is conventional for the fish to comprise two fins 27 each arranged symmetrically with respect to the direction 25, as shown in FIG. 4. In this case, the means for reducing the lift are advantageously applied in a coordinated manner to the two fins 27. More generally, the fish 12 can comprise more than two fins, all of which generate a downwardly directed lift. The invention is already of interest by reducing the lift of one of the fins. Conversely, the fish can comprise only one fin, for example arranged on the nose of the fish 12 as shown in FIG. 5. The invention then consists in reducing the lift of this single fin.

Figure 6:
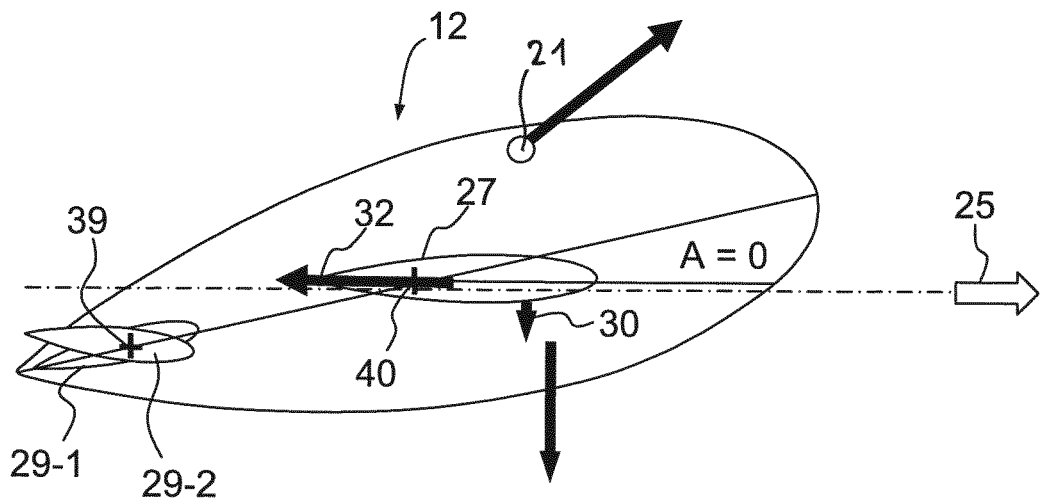
FIGS. 6 and 7 show in greater detail the towed body in each of the hydrodynamic configurations.

FIG. 6 shows a first embodiment of means for reducing the hydrodynamic lift of the fin 27. In this embodiment, the fish 12 comprises means for changing an orientation of the tail 29 so as to change the orientation of the fish with respect to the main direction 25. The fin 27 is advantageously fixed with respect to the supporting structure 23 in order to simplify the design of the fish 12. Alternatively, in this embodiment, the fin 27 can also be movable with respect to the supporting structure 23.

More precisely, in the first configuration of FIG. 3, corresponding to the position of the fish 12 shown in FIG. 2, the fish 12 translationally moves in the water in a direction 25 and the fin 27 makes an angle A with the direction 25. By maneuvering the tail 29 to arrive at the second configuration of FIG. 3, the fish 12 is orientated so as to substantially align the fin 27 and the direction 25. In other words, the angle A becomes substantially zero. Thus, the lift 30 of the fin 27 is greatly reduced. The lift 30 is advantageously zero in this configuration. In FIG. 6, two orientations of the tail 29 are shown. The orientation 29-1 corresponds to the first configuration with high lift and the orientation 29-2 corresponds to the second configuration with reduced lift. The fish 12 comprises a pivot link 39 allowing the tail 29 to rotate. The pivot link 39 allows the tail 29 to rotate about a horizontal axis perpendicular to the direction 25.

Figure 7:
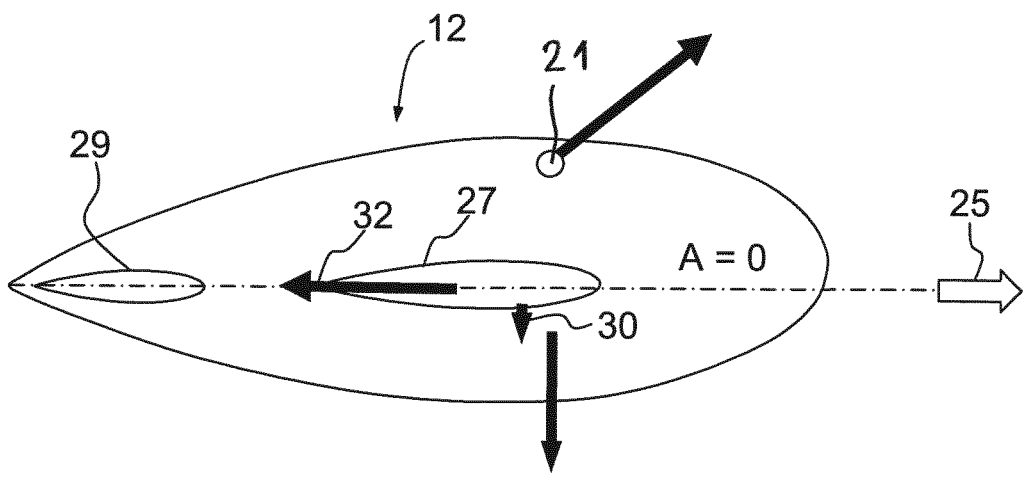

FIG. 7 shows a second embodiment of means for reducing the hydrodynamic lift of the fin 27. In this embodiment, the fish 12 comprises means for changing an orientation of the fin 27. In this embodiment, the general orientation of the fish 12 with respect to the direction 25 remains unchanged during the maneuvering of the fin 27. This orientation of the fish 12 is given by the tail 29 which, in this embodiment, can be fixed with respect to the supporting structure 23. However, by changing the orientation of the fin 27, the lift thereof is reduced or even canceled. The fish 12 comprises a pivot link 40 allowing the fin 27 to rotate. The pivot link 40 allows the fin 27 to rotate about a horizontal axis perpendicular to the direction 25.

The second embodiment has the advantage of not changing the orientation of the fish 12 with respect to direction 25. The drag 32 thus remains unchanged.

To change the orientation of the fin 27 or that of the tail 29, it is possible to motorize the corresponding pivot link, i.e. that of the tail 29 or that of the fin 27. This solution makes it possible to vary the lift continuously. The motorization can be produced using an electric motor possibly associated with a reduction gear or using hydraulic means, such as, for example, a jack. Nevertheless, the motorization is complex to implement.

A simpler solution consists in the fish 12 comprising a lock for maintaining the orientation making it possible to obtain the hydrodynamic lift of the fish 12 at a maximum value and means for unlocking the lock. In other words, the lock makes it possible to keep the angle A at the value thereof making it possible to obtain the desired lift. By freeing the lock, the orientation of the fin 27 or that of the tail 29 is modified so as to reduce the lift of the fin 27. In other words, the means for reducing the hydrodynamic lift of the fin are configured to change the hydrodynamic lift from a first discrete value to a second discrete value, the first value corresponding to the maximum lift of the fish 12 and the second value corresponding to the minimum lift of the fish 12. It is recalled that the hydrodynamic lift of the fish has been defined downwards. The maximum value of the lift tends to drive the fish downward while the minimum or reduced value of the lift tends to raise the fish 12 towards the surface of the water.

The orientation of the fin 27 or that of the tail 29, and the lock 45, are independent of the catch 21 and therefore of the fixing of the fish 12 on the cable 14. Irrespective of the orientation of the fin 27 or that of the tail 29, the fish 12 remains fixed to the cable 14.

Figure 8:
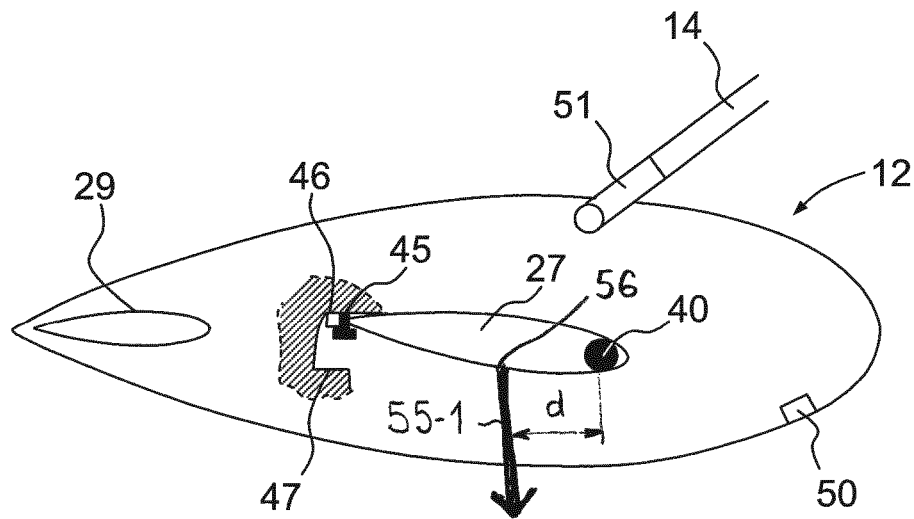
FIGS. 8 and 9 show an example of using a lock 45 configured to cause the towed body to move from one hydrodynamic configuration to the other.
Figure 9:
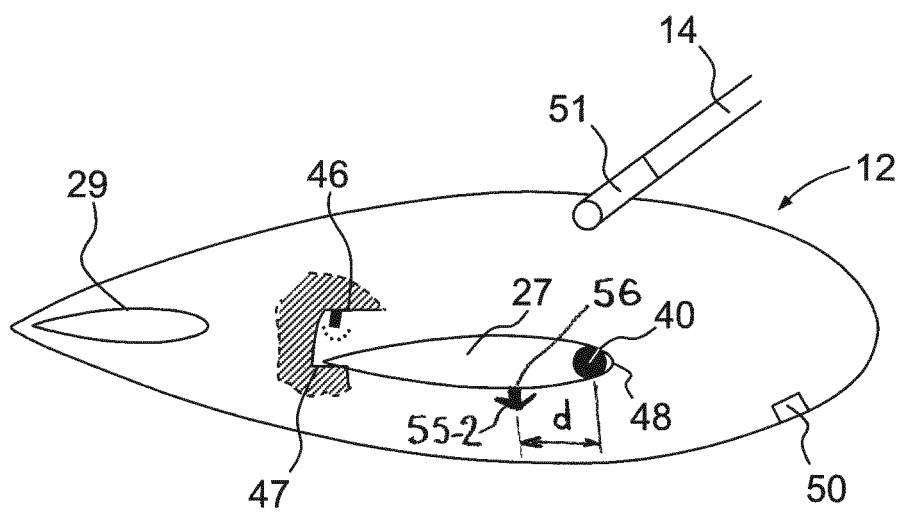

FIGS. 8 and 9 show an example of using a lock 45 configured to keep the fin 27 in the first configuration of FIG. 3. Of course, this example can also be used in the alternative of FIG. 6 in order to change the orientation of the tail 29. The locked configuration is shown in FIG. 8. In FIG. 9, the lock 45 is unlocked, and the fish 12 moves into the second configuration of FIG. 3. The fish 12 comprises two stops 46 and 47 limiting the movement of the fin 27 in the rotation thereof about the pivot link 40. The fin 27 can bear against either of the stops 46 and 47 in the vicinity of the trailing edge 47 thereof and the pivot link 40 is arranged in the vicinity of the leading edge 48 of the fin 27. The lock 45 keeps the fin 27 bearing against the stop 46 and, in the unlocked position, the fin 27 bears against the stop 47. It is also possible to move the pivot link 40 away from the leading edge 48. The fin 27 is configured to move from the locked configuration to the unlocked configuration under the effect of the hydrodynamic lift specific to the fin 27. In other words, by freeing the lock 45, the lift specific to the fin 27 drives it from the first position thereof where it bears against the stop 46 towards the second position thereof where it bears against the stop 47.

The hydrodynamic lift specific to the fin 27 is shown by the resultant 55-1 thereof in FIGS. 8 and 55-2 in FIG. 9. It has been seen above that the hydrodynamic lift specific to the fin 27 is the main contributor to the overall hydrodynamic lift of the fish 12. The modulus of the resultant (algebraic value of the lift) 55-1 is much greater than the modulus of the resultant 55-2. The point of application of the two resultants 55-1 and 55-2 is noted 56 in both figures. The pivot link 40 is offset from the point of application 56 so as to allow the passage from the first position to the second position under the effect of the hydrodynamic lift specific to the fin 27. In the example shown, the offset is formed by a distance d measured in the main direction 25. In other words, the pivot link 40 is located in front of the point of application 56.

The example shown in FIGS. 8 and 9 is well suited to the embodiment of FIG. 7 in which the fin 27 is moveable and the tail 29 is fixed. It is possible to configure the embodiment of FIG. 6 so that freeing the lock drives the tail 29 from the position thereof generating a maximum overall hydrodynamic lift of the fish 12 towards the position thereof where the lift is reduced. This drive takes place under the effect of the hydrodynamic lift specific to the tail. As above, the tail 29 can be driven by means of an offset between the position of the pivot link 39 linking the tail 29 to the supporting structure 23 and the point of application of the resultant of the hydrodynamic lift specific to the tail 29. As the tail 29 is located at the rear of the fish, the pivot link 39 is offset towards the rear of the tail 29 with respect to the point of application of the resultant of the hydrodynamic lift specific to the tail 29.

The embodiment shown in FIGS. 7, 8 and 9 where the fin 27 is movable has an advantage in positioning the pivot link 40 in front of the point of application 56. Indeed, the weight of the fin 27 also contributes to driving the fin 27 from the first position thereof where it bears against the stop 46 towards the second position thereof where it bears against the stop 47.

The lock 45 can be formed by any mechanical member making it possible to keep the fin 27 bearing against the stop 46. The lock 45 is, for example, formed by a latch that can assume two positions. In a first position, the latch keeps the fin 27 bearing against the stop 46 and, in a second position, the latch frees the fin 27. The latch can be moved by a mechanical or electromechanical system maneuvered remotely from the ship. The command signal of the electromechanical system passes through the cable 14.

The lock 45 can, alternatively, be formed by an explosive bolt. More generally, the means for unlocking the lock 45 comprise an explosive member. The explosive bolt has the advantage of being triggered faster than a latch. When the fish 12 is launched, the bolt fixes the fin such that it bears against the stop 46 thereof. The bolt comprises an explosive charge making it possible to break it and free the movement of the fin 27. The explosive charge is, for example, remotely commanded from the ship 10.

However, the use of an explosive charge has a disadvantage. It is not possible to place the fin 27 back in position against the stop 46 thereof when the fish is pulled. The resetting of the bolt 45 requires a bolt-changing operation, which operation can only be carried out once the fish 12 is aboard the ship 10. This disadvantage nevertheless constitutes a minimal inconvenience. Indeed, once the lock 45 is opened, the lift of the fin 27 is reduced and the depth thereof decreases. Even in this configuration, it is always possible to continue the sonar mission. The performance of the sonar is simply reduced thereby.

Alternatively again, the lock 45 can be produced by means of a magnetic or electromagnetic system keeping the fin 27 in contact with the stop 46.

Another embodiment of the lock and of the stops consists in integrating them in the pivot link 40. The stops are then arranged around the shaft of the pivot link. The lock function integrated in the pivot link can be fulfilled by a member, for example a mechanical or magnetic member, keeping the shaft of the pivot link bearing against one of the stops. It is also possible to fulfill the lock function using any type of motor, for example an electric or hydraulic motor, allowing the rotation of the pivot link 40. The electric motor is, for example, associated with a counter-reaction enabling it to keep the fin 27 in a given angular position using a large torque.

As mentioned above, the lock 45 can be commanded manually by an operator on board the ship. For example, as soon as an order to increase the ship speed is given, the operator can trigger the lock 45 or more generally the command for reducing hydrodynamic lift of the fin 27.

Alternatively, the command can be automated. Triggering occurs, for example, when a sensor measures a parameter, the value of which exceeds a given threshold. The sensor can, for example, be a sounding machine 50 fitted on the fish 12 or the ship 10. When the sounding machine detects the presence of a shoal, in other words if the depth measured by the sounding machine becomes less than a given depth, the result of the comparison between the measured depth and threshold depth makes it possible to trigger the command for reducing hydrodynamic lift of the fin 27. The sensor can also be a force sensor 51 measuring the pull of the cable 14. The force sensor 51 can measure the pull of the cable 14 in the fish 12 at the attachment between the cable 14 and the fish 12 or on the ship 10 at the winch. If a given pull value is exceeded by the pull measured on the cable 14, this can trigger the command for reducing hydrodynamic lift of the fin 27.

The automation of the command can be linked to a supply of power to the fish 12. For example, a loss of power can trigger the opening of the lock 45. Power is supplied to the fish 12 via the cable 14. This powering can power an electromagnet keeping the lock 45 closed. In the event of loss of power supply, due for example to a cut in an electrical conductor, the electromagnet is no longer powered, which causes the lock 45 to open. More generally, the lock 45 is configured so that the powering of the fish 12 keeps the lock 45 in a locked configuration and so that a cut in power opens the lock 45.

In a simple manner, in conjunction with this function for monitoring the powering of the fish 12, the manual command of the lock 45 can be a simple switch 58 for opening a power supply circuit for the fish 12. The switch 58 is, for example, arranged on the rear platform 19 of the ship 10 proximate to the winch 16.

The invention claimed is:

1. A fish intended to be submerged and towed by a cable, the fish comprising:
a supporting structure configured to move in water in a horizontal main direction and at least one appendage configured to generate, for the fish, a hydrodynamic lift directed downwards when the fish moves in the water under the towing effect, wherein the appendage is orientable between a first position generating a maximum value of the hydrodynamic lift of the fish and a second position generating a reduced value of the hydrodynamic lift of the fish, and wherein the fish comprises a lock which, in a locked configuration, keeps the appendage orientated in the first position and which, in an unlocked configuration, frees the orientation of the appendage, and wherein the appendage is configured to move from the first position to the second position under the effect of a hydrodynamic lift specific to the appendage; and
a first stop and a second stop configured to limit movement of the appendage, wherein in the locked configuration, the lock keeps the appendage bearing against the first stop and, wherein in the unlocked configuration, the appendage bears against the second stop due to the hydrodynamic lift generated by the appendage.

2. The fish as claimed in claim 1, wherein the fish comprises an explosive member configured to unlock the lock.

3. The fish as claimed in claim 1, wherein in the second position, the hydrodynamic lift of the fish is substantially zero.

4. The fish as claimed in claim 1, wherein the appendage comprises at least one fin mainly generating the hydrodynamic lift of the fish depending on the orientation of the supporting structure with respect to the main direction, and the fish further comprises a tail configured to change the orientation of the supporting structure with respect to the main direction.

5. The fish as claimed in claim 4, wherein the fin is fixed with respect to the supporting structure.

6. The fish as claimed in claim 1, wherein the appendage is an orientable fin mainly generating the hydrodynamic lift of the fish.

7. The fish as claimed in claim 6, wherein the fish comprises a tail fixed with respect to the supporting structure, the tail making it possible to maintain the orientation of the supporting structure with respect to the main direction.

8. The fish as claimed in claim 1, wherein the fish comprises a pivot link allowing the rotation of the appendage with respect to the supporting structure and in that the pivot link is offset from a point of application of a resultant of efforts of hydrodynamic lift specific to the appendage so as to allow the movement from the first position to the second position under the effect of the hydrodynamic lift specific to the appendage.

9. The fish as claimed in claim 1, further comprising a sensor for measuring a parameter and in that the fact of a threshold value being exceeded by the measured value causes the lock to move into the unlocked configuration.

10. The fish as claimed in claim 1, further comprising two orientable appendages, and in that the orientations of each of the two appendages are coordinated.

11. The fish as claimed in claim 1, wherein the fish is electrically powered, in that the lock is configured such that the powering of the fish keeps the lock in the locked configuration and such that a cut in power causes the lock to move into the unlocked configuration.

12. A tow line comprising a fish as claimed in claim 1, a ship, a cable fixed to the fish, and, arranged on the ship, means for commanding the lock.

13. The tow line as claimed in claim 12, wherein the means for commanding the lock is configured to be triggered manually.

14. The tow line as claimed in claim 12, further comprising a sensor for measuring a parameter and wherein a threshold value being exceeded by the measured value causes the lock to move into the unlocked configuration.

15. A tow line comprising a fish as claimed in claim 11, a ship, a cable fixed to the fish, and, arranged on the ship, means for commanding the lock, wherein the command means are configured to be triggered manually, wherein the command means comprise a switch for opening a power supply circuit for the fish.

* * * * *